(12) United States Patent
Seiersen et al.

(10) Patent No.: US 7,762,496 B2
(45) Date of Patent: Jul. 27, 2010

(54) OVERHEAD FLIGHT CREW REST

(75) Inventors: Doug Jon Seiersen, Everett, WA (US);
Kyong Shik Kim, Snohomish, WA (US);
James Robert Park, Everett, WA (US);
Duane Michael Egging, Everett, WA (US)

(73) Assignee: The Boeing Company, Chicago, IL (US)

( * ) Notice: Subject to any disclaimer, the term of this patent is extended or adjusted under 35 U.S.C. 154(b) by 707 days.

(21) Appl. No.: 11/541,948

(22) Filed: Oct. 2, 2006

(65) Prior Publication Data

US 2007/0125909 A1   Jun. 7, 2007

Related U.S. Application Data

(60) Provisional application No. 60/741,598, filed on Dec. 2, 2005.

(51) Int. Cl.
*B64D 11/00* (2006.01)
(52) U.S. Cl. .................. 244/118.5; 244/118.6; 105/316
(58) Field of Classification Search .............. 244/118.5, 244/118.6; 105/314, 315, 316; 296/190.02
See application file for complete search history.

(56) References Cited

U.S. PATENT DOCUMENTS 5,784,836 A * 7/1998 Ehrick ........................ 52/79.8
6,305,645 B1 * 10/2001 Moore ...................... 244/118.5
6,464,169 B1 10/2002 Johnson et al.
6,497,388 B1 12/2002 Friend et al.
6,616,098 B2 * 9/2003 Mills ........................ 244/118.5
6,848,654 B1 2/2005 Mills et al.
6,932,298 B1 8/2005 Mills
7,083,145 B2 8/2006 Mills
7,232,095 B2 6/2007 Park et al.
7,237,749 B2 7/2007 Ritts et al.
7,261,786 B2 8/2007 Druckman et al.
7,389,959 B2 6/2008 Mills \* cited by examiner

*Primary Examiner*—J. Woodrow Eldred
(74) *Attorney, Agent, or Firm*—Harness, Dickey & Pierce, P.L.C.

(57) ABSTRACT

The present disclosure relates to an aircraft having a fuselage. The fuselage may have a plurality of frame members, a cabin formed within the fuselage, a floor defining a portion of the cabin, a center section of seats disposed on the floor, a crown positioned above a center section of seats, and a crew rest module. The crew rest module may have an entrance module defined by at least two entrance module peripheral walls and having a seating area, and a bunk module being separate from the seating area and being defined by at least three bunk module peripheral walls. The entrance module peripheral walls and the bunk module peripheral walls may be sized to fit through a passenger door of a substantially assembled aircraft.

20 Claims, 8 Drawing Sheets

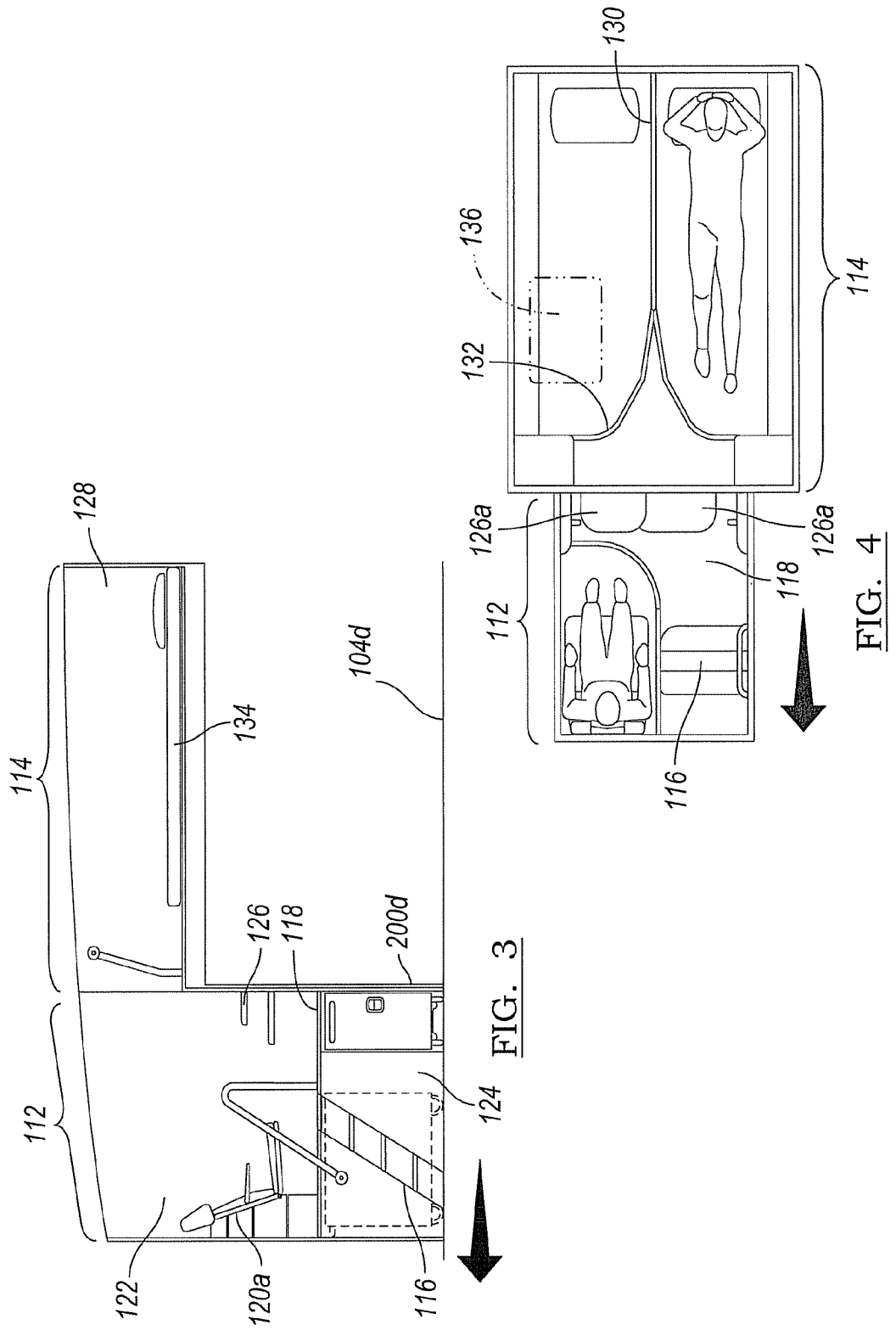

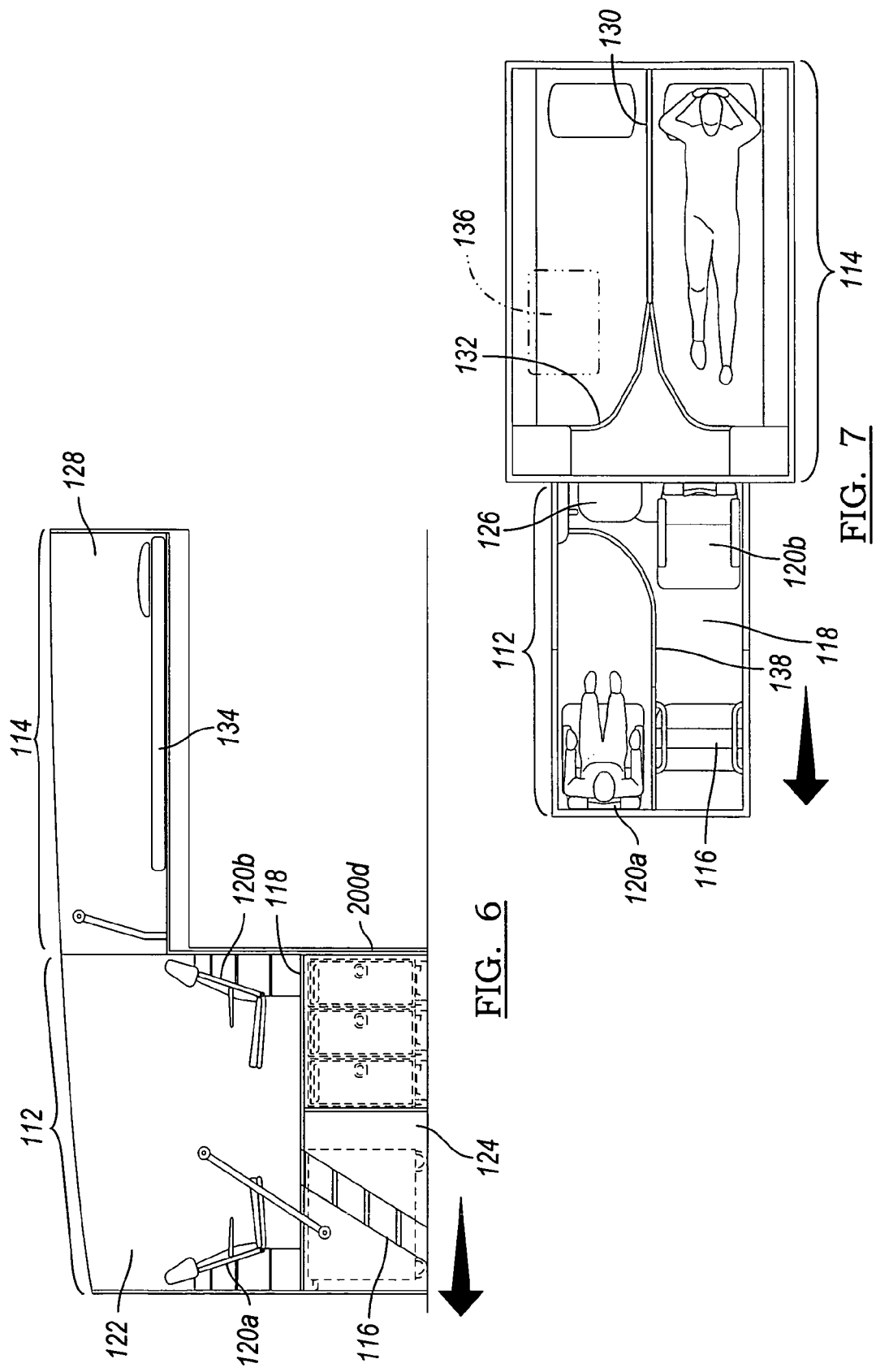

OVERHEAD FLIGHT CREW REST

CROSS-REFERENCE TO RELATED APPLICATIONS

This application claims the benefit of U.S. Provisional Application No. 60/741,598 filed on Dec. 2, 2005, the disclosure of which is incorporated herein by reference.

FIELD

The present disclosure relates to crew rest modules used on mobile platforms, and particularly to a crew rest module well-suited for use in a commercial aircraft.

BACKGROUND

The statements in this section merely provide background information related to the present disclosure and may not constitute prior art.

On mobile platforms such as commercial aircraft, buses, trains, ships, etc., crew members must often work for extended periods of time before the mobile platform reaches its destination. It is highly advantageous if members of the crew have an area that they can repose to for brief rest periods away from other activities taking place on board the mobile platform. Such crew rest areas should ideally provide an additional degree of privacy to the crew members when the crew members are resting, and even more preferably provide a place where a crew member can lay down and relax.

On many forms of mobile platforms, and particularly on a commercial aircraft, space for crew rest areas is very limited. Space may be found at the forward or aft end of the aircraft, in a passenger cabin area, or near the flight deck, depending upon the size and configuration of the particular aircraft. Therefore, it would be especially desirable to provide a crew rest module that can be adapted for use on a mobile platform where space is extremely limited, and particularly on a commercial aircraft.

In addition to space limitations to accommodate the crew rest, crew rests are provided as large, pre-assembled, and free-standing monuments and often must be installed prior to the final assembly of the frame or the fuselage of the mobile platform to allow sufficient clearance for its placement in and securing to the mobile platform. The pre-assembled crew rest adds extra weight to the mobile platform due to the internal support and bracketry of the pre-assembled monument. The heavy weight and pre-assembled attributes may make some crew rests difficult or awkward to install. It is desirable to provide a crew rest that is light weight, efficient to install, and does not require installation prior to the final assembly of the mobile platform.

It would also be highly desirable if the crew rest module could accommodate at least a pair of individuals simultaneously while creating a very limited footprint, and thus form a highly space efficient structure within the mobile platform.

SUMMARY

The present disclosure relates to an aircraft. The aircraft may comprise an airframe having a fuselage. The fuselage may comprise a plurality of frame members, a cabin formed within the fuselage, a floor defining a portion of the cabin, a center section of seats disposed on the floor, a crown positioned above a center section of seats, and a crew rest module. The crew rest module may comprise an entrance module defined by at least two entrance module peripheral walls and having a seating area, and a bunk module being separate from the seating area and being defined by at least three bunk module peripheral walls. The entrance module peripheral walls and the bunk module peripheral walls may be sized to fit through a passenger door of a substantially assembled aircraft.

The present disclosure also relates to an aircraft that may comprise an airframe having a fuselage. The fuselage may comprise a cabin formed within the fuselage, a floor defining a portion of the cabin, and a crew rest module disposed within the cabin of the fuselage. The crew rest module may comprise an entrance module defined by at least two entrance module peripheral walls and having a seat supported on a floor portion of the entrance module. The floor portion may be elevated above the floor of the cabin by a predetermined height. A bunk module may be provided that is separate from, but adjacent to, the entrance module. The bunk module may be defined by at least three bunk module peripheral walls. The entrance module peripheral walls and the bunk module peripheral walls are sized to fit through a passenger door of a substantially assembled aircraft.

The present disclosure also relates to an aircraft that may comprise an airframe including a fuselage. The fuselage may comprise a cabin formed within the fuselage, a floor defining a portion of the cabin; and a crew rest module disposed within the cabin of the fuselage. The crew rest module may comprise an entrance module defined by at least two entrance module peripheral walls and having first and second seats supported on a floor portion of the entrance module. The floor portion may be elevated above the floor of the cabin by a predetermined height to enable placement of a galley cart underneath the floor portion. A first stairway may be used for assisting with ingress and egress between the floor of the cabin and the entrance module. The first and second seats may be secured to the floor portion of the entrance module in opposite facing directions and may be laterally offset from one another. A moveable privacy curtain may be positioned between the first and second seats. A bunk module may be separate from, but adjacent to, the entrance module, the bunk module may be defined by at least three bunk module peripheral walls. The bunk module may further have a floor portion that is disposed elevationally above a floor portion of the entrance module, with the bunk module having dimensions permitting a crew member to repose therein. A second stairway may be disposed adjacent the bunk module for assisting a crew member with ingress and egress between the entrance module and the bunk module. An alternate egress opening may be formed in the floor portion of the bunk module. The entrance module peripheral walls and the bunk module peripheral walls may be sized to fit through a passenger door of a substantially assembled aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a side view of a crew rest module having a single-seat configuration;

FIG. 4 is a top view of the single-seat crew rest module depicted in FIG. 3;

FIG. 6 is a side view of a crew rest module having a dual-seat configuration;

FIG. 7 is a top view of the dual-seat crew rest depicted in FIG. 6;

DETAILED DESCRIPTION

The following description is merely exemplary in nature and is not intended to limit the present disclosure, application, or uses. Additionally, the advantages provided by the disclosed embodiments, as described below, are exemplary in nature and not all embodiments necessarily provide the same advantages or the same degree of advantages.

Figure 1:
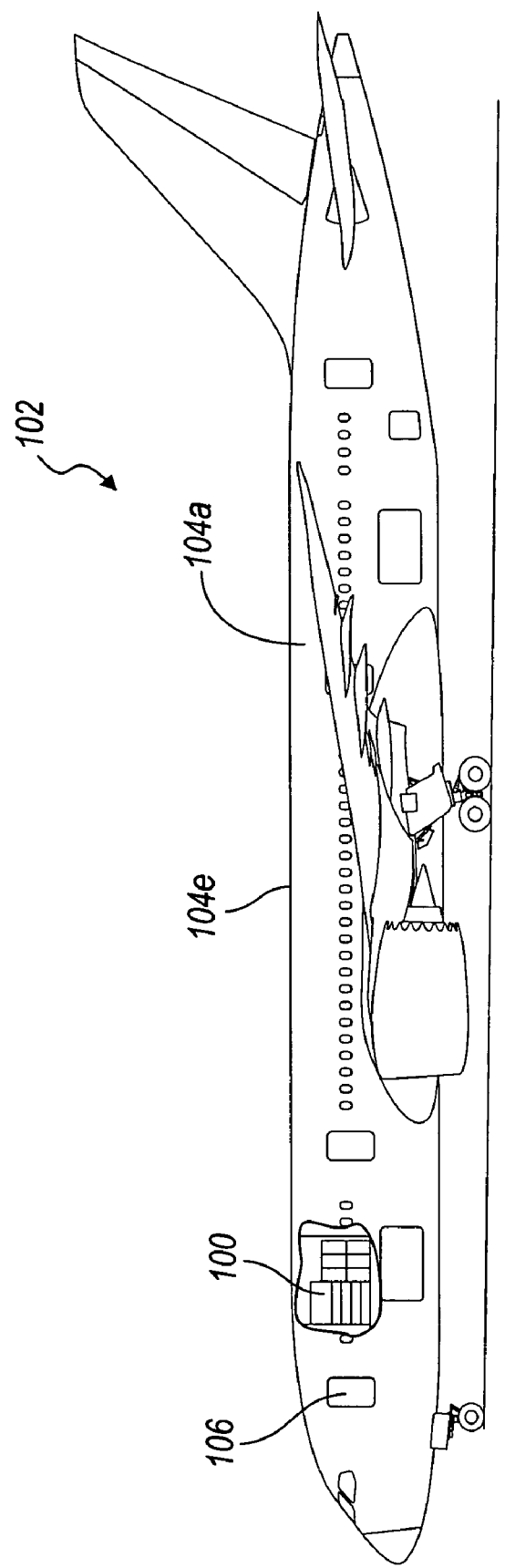
FIG. 1 is a side view of a mobile platform, in this example a commercial aircraft, with a portion of the fuselage broken away to illustrate an exemplary embodiment of a crew rest module at a forward end of the aircraft.
Figure 2:
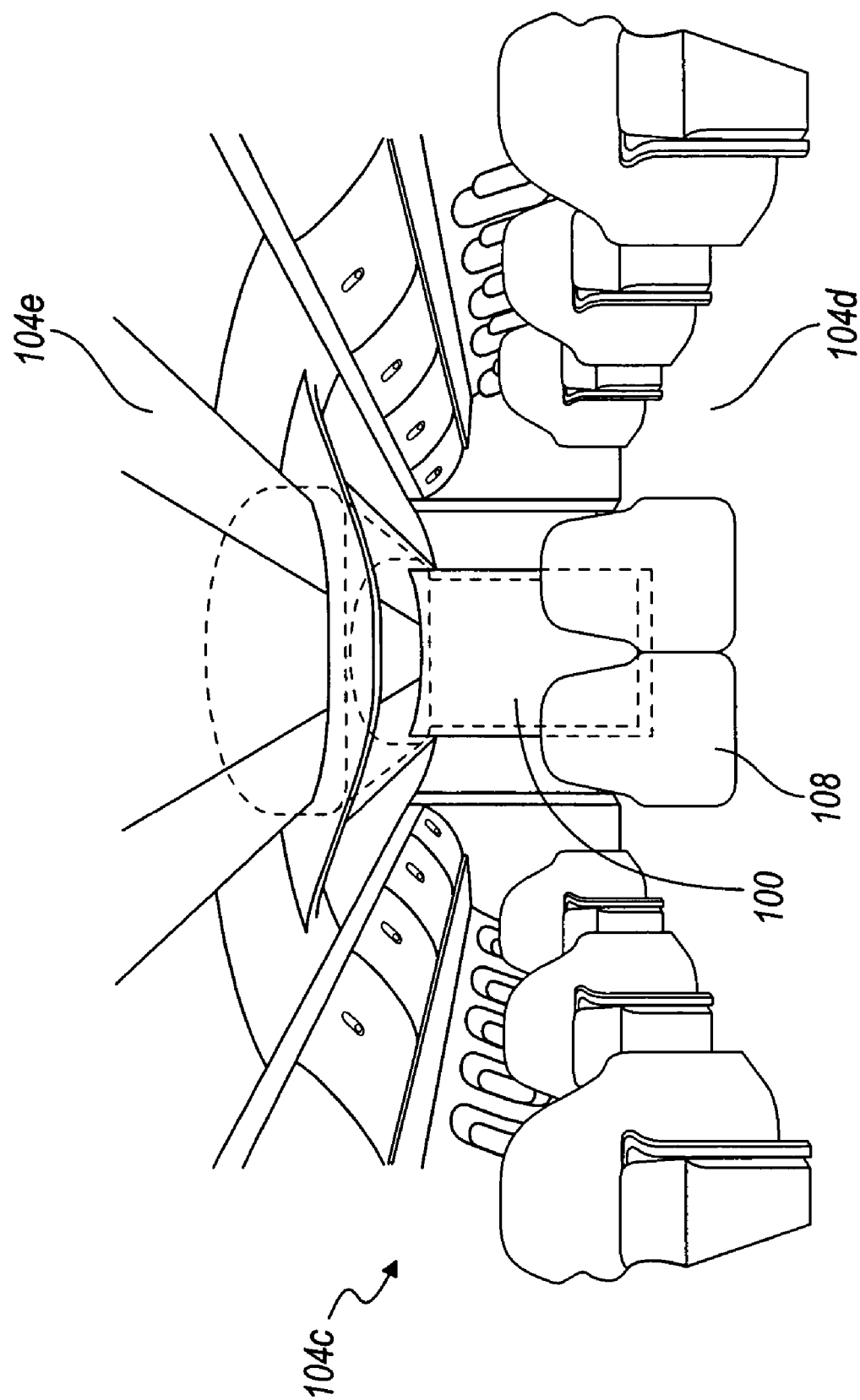
FIG. 2 depicts an environmental view of a crew rest module in the aircraft.

Referring to FIGS. 1 and 2, there is shown a crew rest module 100 in accordance with one embodiment of the present disclosure inside a mobile platform 102. The crew rest module 100 is shown disposed at a forward portion of the mobile platform 102, but it could easily be incorporated at a different location. The darkened arrows indicated on various ones of the figures point towards the forward portion of the mobile platform 102. In this example, the mobile platform 102 comprises a commercial passenger aircraft, and will be referred throughout the following discussion as "aircraft 102". However, it will be appreciated that the crew rest module 100 could be implemented in other forms of mobile platforms such as in a ship, train, bus, or virtually any other form of vehicle where cabin space is limited.

Figure 10:
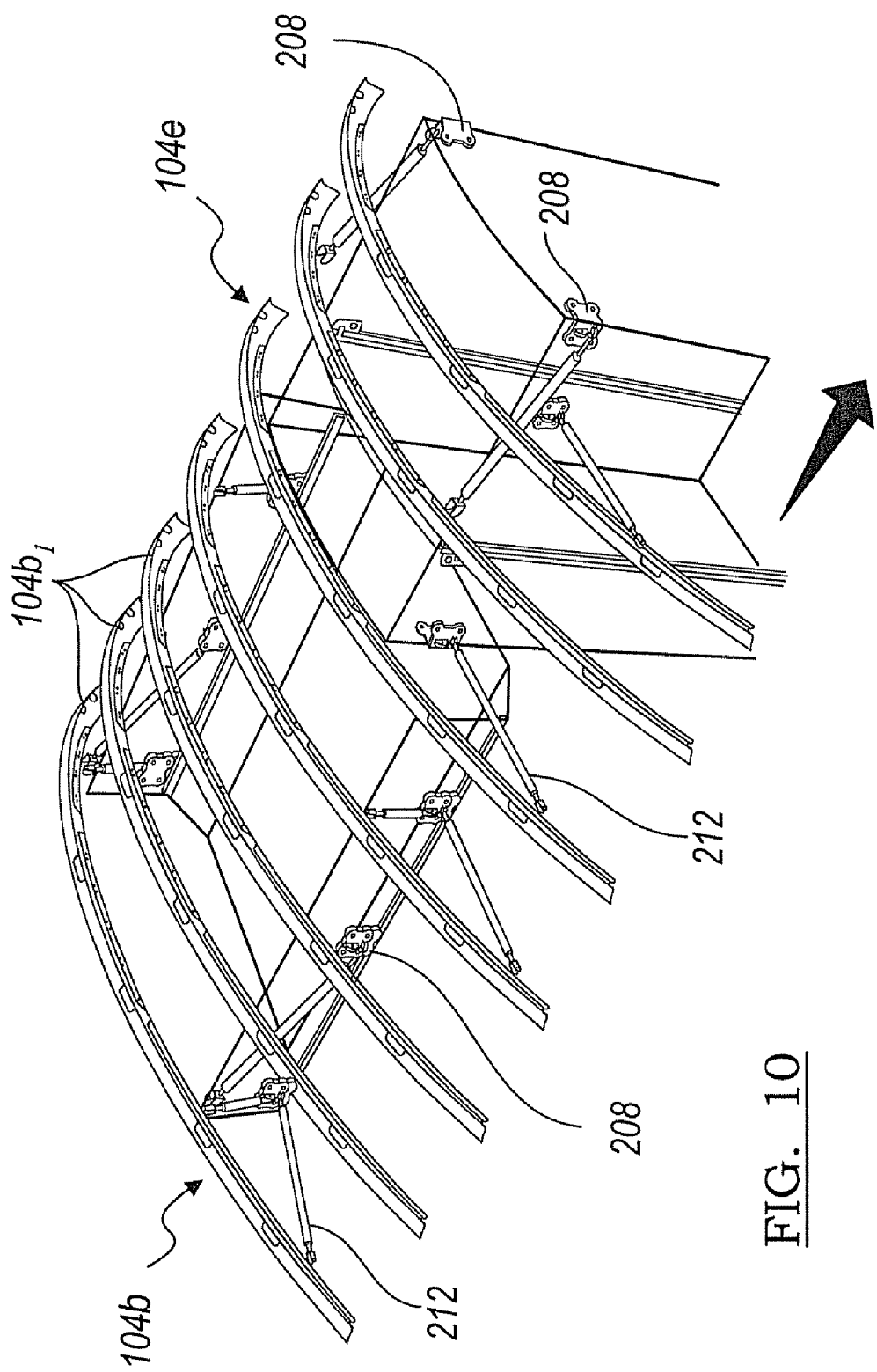
FIG. 10 is a perspective view of the structural interface to support the crew rest module.

The mobile platform 102 includes a fuselage 104a, a frame 104b, (as shown in FIG. 10), a cabin 104c, a floor 104d in the cabin, a crown 104e, and a main cabin door 106. The aircraft 102 can optionally include a central seating section 108.

Figure 5:
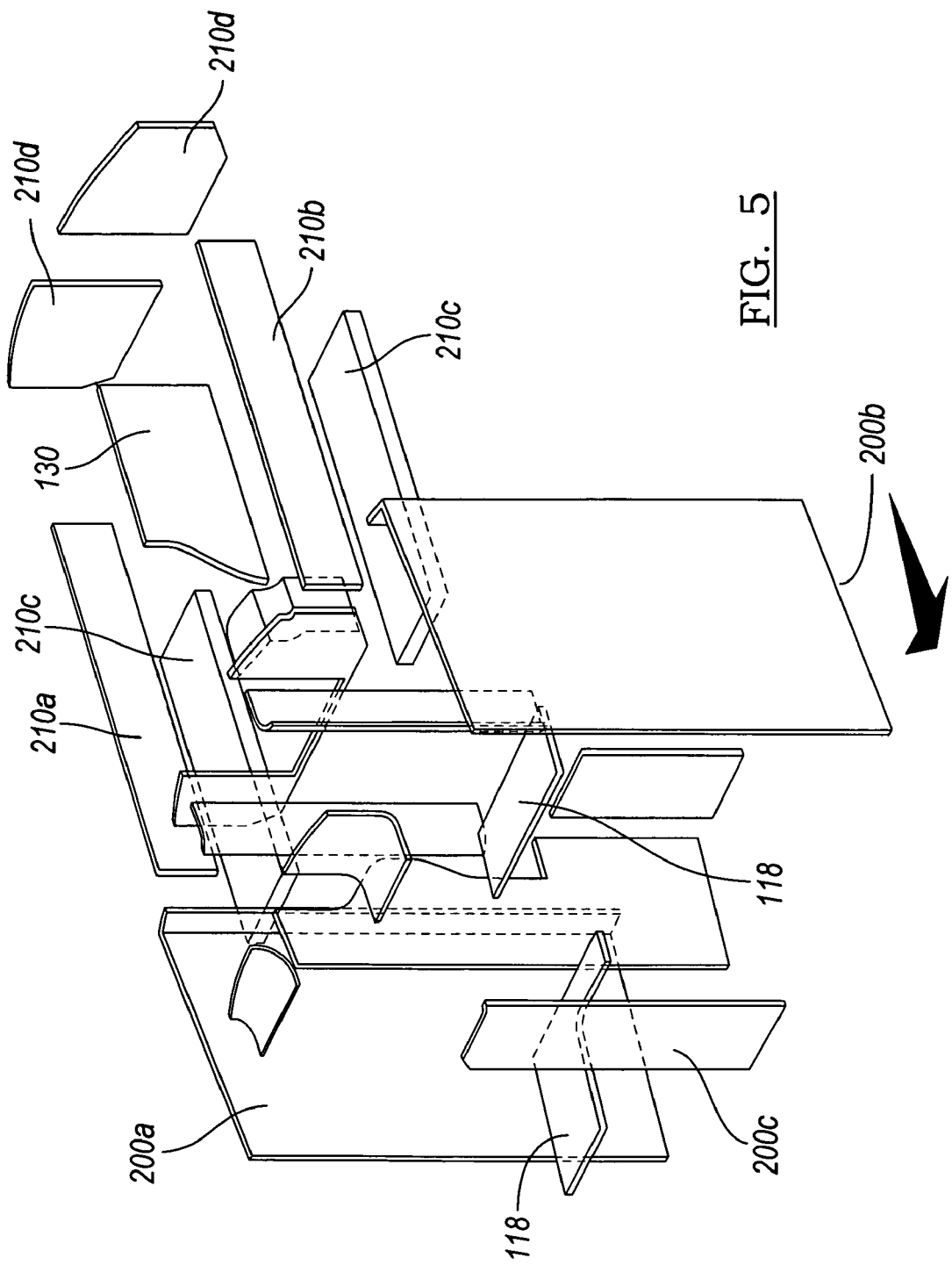
FIG. 5 is an exploded view of a single-seat crew rest module.
Figure 8:
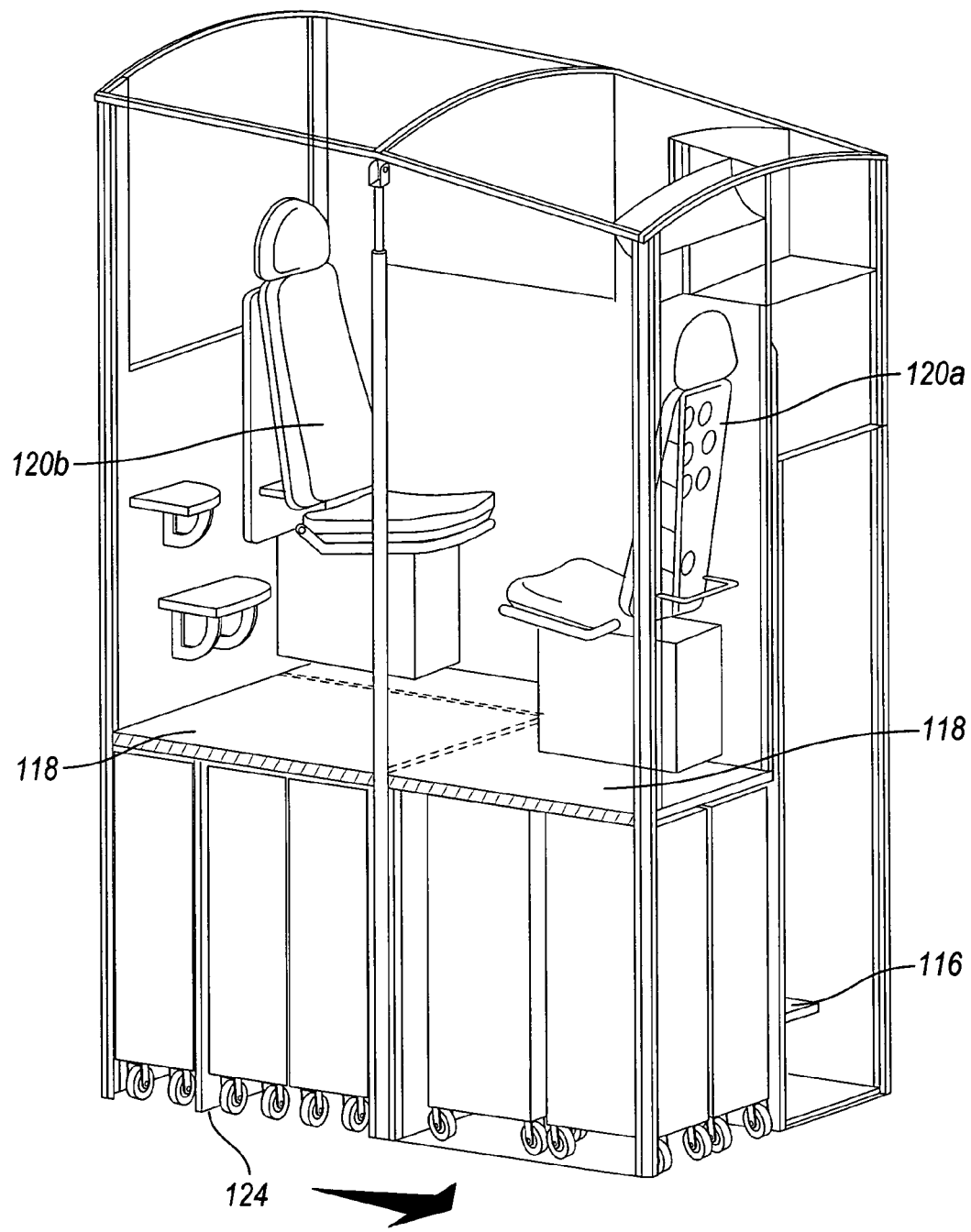
FIG. 8 is a perspective view of front region of the dual-seat crew rest module.

Referring to FIGS. 3 through 5, the crew rest module 100 is shown in greater detail. The crew rest module 100 contains an entrance module 112 and a bunk module 114.

The entrance module 112 includes a first stairway 116 by which a crew member can access the crew rest module 100 from within the aircraft 102. The stairway 116 leads to an elevated platform 118 on which a first seat 120a is disposed. The stairway 116 can be located at any position relative to the first seat 120a to provide sufficient clearance for the crew member's passage into the entrance module 112. The area containing the first seat 120a comprises a seating area 122 of the entrance module 112. The elevated platform 118 preferably is set at a height to provide a stowage area 124 underneath the seating area 122 for stowage, for example, a full size galley cart. The elevated platform 118 allows the crew member to stand partially erect inside of the entrance module 112 and in the seating area 122.

The elevated platform 118 further includes a second stairway 126 to provide passage from the seating area 122 to the bunk module 114. The second stairway 126 is partially defined by the elevated platform 118 and can further include staggered steps or large platform steps 126a to facilitate passage of the crew member from the seating area 122 into the bunk module 114. As shown, there are two or three platform steps 126a, but it is understood that more or less steps can be used. In various embodiments, the large platform steps 126a are offset from one another. The offset steps 126a allow a crew member to advance upwards towards the bunk module 114 and then towards either a right or left region of the bunk module 114, respectively.

The bunk module 114 includes at least one berth 128. The berth 128 is suitably sized to provide comfortable spacing for a crew member to comfortably recline or repose within the berth 128. In embodiments where the bunk module 114 includes two berths 128, the berths 128 can be separated by a partial wall 130 and optionally by a curtain 132. Each berth 128 can include a mattress 134. Exemplary berth 128 measurements include a length of about 78 inches, a width of at least about 30 inches, and a volume of at least about 35 square feet.

In mobile platforms which have a center seating section 108, the space above a region of the center seating section 108 is useful to accommodate the bunk module 114. Using the space above the center seating section 108 limits the footprint of the crew rest module 100 to only that of the entrance module 112. It is understood that the bunk module 114 does not encroach upon the overhead space of any passengers in the central seating section 108 and therefore does not interfere with their enjoyment of personal space in the aircraft 102.

In various embodiments, each berth 128 includes an entertainment and amenity system accessible for use by the crew member utilizing the crew rest module 100. The entertainment and amenity system can includes such things as audio and video devices, internet access ports, security cameras, individual temperature control, alarm clock, intercom, in flight monitors, small stowage for personal effects, etc. It is understood that the entertainment and amenity system items can be included in any area of the crew rest module 100.

The berth 128 further includes an alternate egress 136. The alternate egress 136 can be defined in any region of the berth 128. Regulations may require an alternate egress for enclosed space in an aircraft 102. As shown in FIG. 4, the alternate egress 136 is located in a floor of the berth 128. Accessing the floor of the berth 128 can easily be achieved by displacing any padding, such as the mattress 134 in the berth 128 and engaging the emergency egress, for example, using a latch. The alternate egress 136 includes a removable barrier mechanism suitable to block the alternate egress 136 when emergency egress from the berth 128 is not needed, but easily removable when emergency egress is needed. For example, the removable barrier mechanism can be a blow out panel, a hinged door, removable panel, or a locking door, as non-limiting examples.

Referring to FIGS. 6 through 9, the entrance module 112, in one embodiment, includes the first seat 120a and a second seat 120b. The first seat 120a and the second seat 120b can be located in oppositely facing directions. Placement of the first seat 120a and the second seat 120b are oriented with respect to the first stairway 116 and the second stairway 126 such that a crew member can easily navigate through the entrance module 112, past another seated crew member, and into the bunk module 114 or seat 120a or 120b. In embodiments having two seats, it may be advantageous to provide a privacy enhancing barrier between the first seat 120a and the second seat 120b. An exemplary privacy enhancing barrier is a curtain 138. The curtain 138 can be removed such that the crew members can face each other. The seats 120a, 120b are disposed on the elevated platform 118. The elevated platform 118 spans the length and width of the entrance module 112 to accommodate the seats 120a and 120b. The elevated platform 118 provides a stowage area 124.

Referring to FIGS. 5, 6, and 8 through 10, in various embodiments, the crew rest module 100 is a modular system that can be installed after the mobile platform 102, such as an aircraft, is substantially assembled. Generally, a commercial aircraft is manufactured in sections. A crew rest module would be installed directly into the fuselage 104a through an opening in the fuselage 104a, prior to the final assembly of the aircraft body. Generally, the space provided for crew rest module installation is equal to the full body diameter of the fuselage 104a. The substantially assembled aircraft does not have this much space accessible for entrance into the aircraft as it may include the final rivets, welds, or any other fastening techniques used to join the aircraft body. The substantially assembled aircraft generally includes an opening, such as a cabin door 106, through which the passengers enter, and only provides sufficient space for a person to enter comfortably while carrying a piece of carry-on luggage or another personal item.

The entrance module 112 and the bunk module 114 comprise a plurality of peripheral walls. All of the peripheral walls, internal walls, supporting bracketry, etc. for the crew rest module 100 are sized to fit through the cabin door 106 of the aircraft 102. It is understood that the entrance module 112, the bunk module 114, or subcomponents thereof can be at least partially or fully assembled prior to placing the entrance module 112 or the bunk module 114 into the aircraft. The partially or fully assembled entrance module 112 or bunk module 114 are also sized to fit through the cabin door 106 of the aircraft 102.

The entrance module 112 comprises at least two entrance module peripheral walls 200a and 200b (with only a portion of wall 200a being shown to avoid blocking the illustration of other components). The entrance module peripheral walls 200a, 200b define an entry 202 and the seating area 122. The entrance module peripheral walls 200a, 200b are secured to at least one of the floor 104d and the crown 104e of the aircraft 102. Securing the entrance module peripheral walls 200a, 200b to the crown 104e and/or the floor 104d utilizes the existing architecture of the aircraft 102 to support the crew rest module 100. This reduces the amount of additional bracketry that must be used to provide proper weight-bearing support to the crew rest module 100.

The entrance module 112 can also include additional walls for the sides or back of the entrance module 112 such as walls 200c and 200d and optional internal walls. These side or back walls can be full walls spanning from the floor 104d to the crown 104e, or can be partial walls that span only part way between the crown 104e and the floor 104d. A partial wall, such as peripheral wall 200c, is useful to provide an opening at the interface of the entrance module 112 and the bunk module 114 so that a crew member can enter the bunk module 114. The additional walls 200c, 200d can be used to further define the entrance way and enhance privacy of the crew rest module 100. It is understood that the entrance module peripheral walls 200a and 200b and optionally 200c and 200d can be formed as single walls or multi-component walls. For example, the peripheral wall 200a and/or 200b can have two or more subsections to form the wall. or multi-component walls. For example, the peripheral wall 200a and/or 200b can have two or more subsections to form the wall.

The entrance module 112 elevated platform 118 spans the width of a space between the entrance module peripheral walls 200a and 200b. The elevated platform 118 is structurally coupled to the entrance module peripheral walls 200a, 200b.

With reference to FIG. 7, in embodiments having two seats, the entrance module 112 includes at least four peripheral walls 200a, 200b, 200e, and 200f. The peripheral walls can be assembled as pairs 200a and 200e and 200b and 200f, respectively, where the members of the respective pair can be attached together with split joint bracketry 206. The peripheral walls or peripheral wall subcomponents can optionally be connected using a tab and slot joint. The tabs can be included on one of the peripheral walls and the slots can be included on the other of the peripheral walls. The tab and slot joints can provide a tight interference fit or a partial fit leaving a gap or space between the peripheral walls.

The assembly and set-up of the single seat crew rest and a two seat crew rest are substantially the same. One of the additions is the incorporation of at least two additional peripheral walls 200e and 200f to provide room to accommodate the second seat 120b. This system provides flexibility in construction and allows the same types of modular kits or components to be used in a variety of mobile platforms having different crew rest needs and different mobile platform cabin and fuselage specifications. The side and back walls 200c, 200d as detailed above can similarly be incorporated into an entrance module 112 having two seats 120a, 120b. As stated above herein, the elevated platform 118 can be extended to accommodate the second seat 120b and to provide additional stowage space for galley carts or other items.

Figure 9:
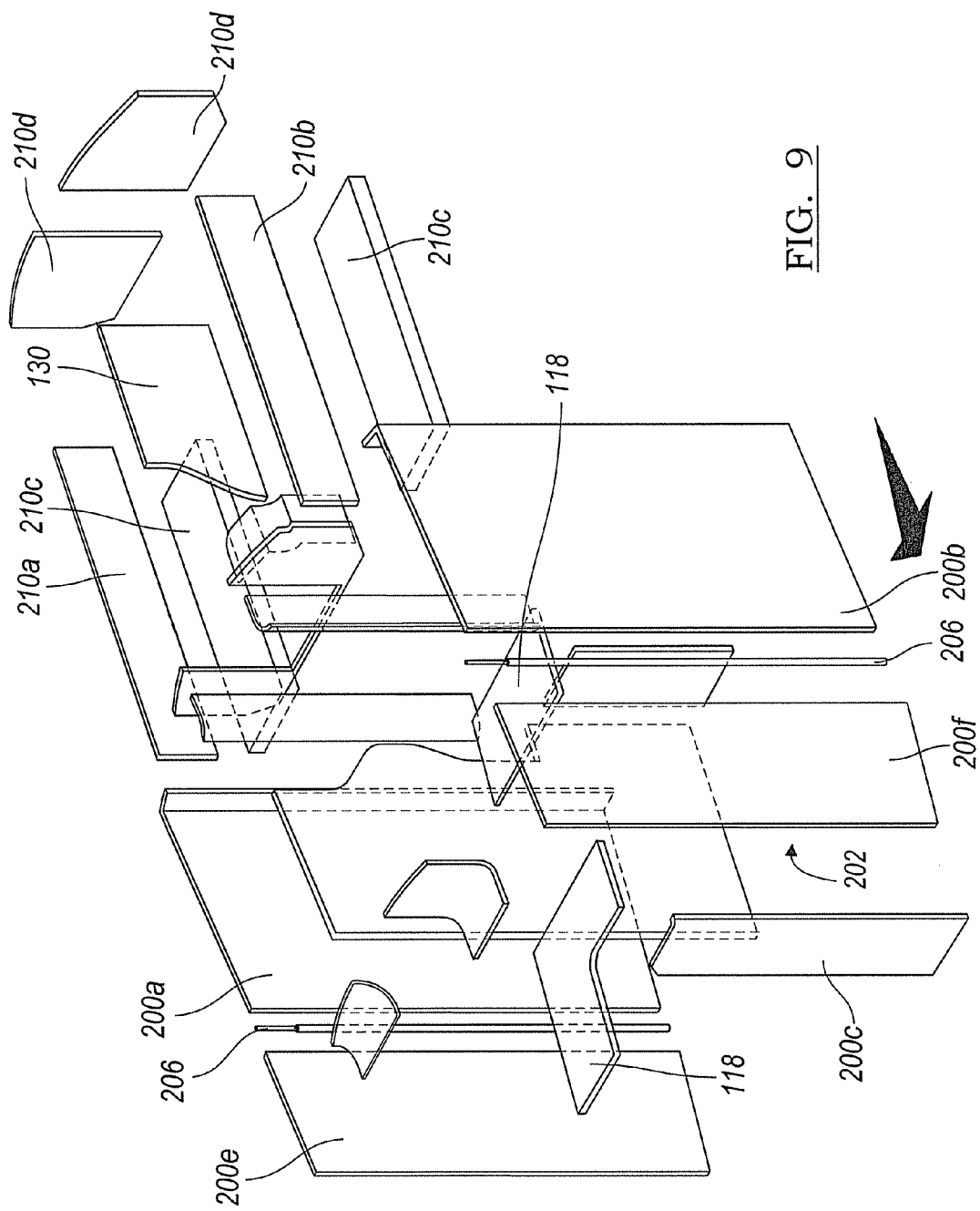
FIG. 9 is an exploded view of a dual-seat crew rest module.

Referring to FIG. 9, the bunk module 114 includes at least three bunk module peripheral walls 210a, 210b, and 210c. The bunk module peripheral walls 210a and 210b are secured to the crown 104e of the aircraft 102. The peripheral walls 210c form the base of the bunk module 114 and are attached to each of peripheral walls 210a and 210b. The bunk module 114 can include an additional side or back walls 210d. The bunk module peripheral walls (including 210a, 210b, 210c, and optionally 210d) can be secured together using for example, split joint bracketry or a tab and slot joint.

Referring to FIG. 10, the bunk module 114 can be secured in the frame 104b via bunk module peripheral walls 210a and 210b. In various embodiments, the bunk module 114 can be secured to a plurality of frame members $104b_1$ in the crown 104e which are about 24 inches apart. The bunk module 114 can be secured to at least five frame members $104b_1$ in the crown 104e. As depicted, tie rods 212 are used to hold the bunk module 114 to the crown 104e and the tie rods 212 can be attached to bracketry 208. The entrance module 112 and the bunk module 114 are joined using tab and slot joints similar to those that used to connect the peripheral walls together.

After the entrance module 112 peripheral walls are connected with the tab and slot joints and secured to the crown 104e and/or floor 104d of the mobile platform 102. The bunk module 114 peripheral walls are connected with the tab and slot joints and secured to the crown 104e of the mobile platform.

The space or gap between the tab and slot joints can be filled with an adhesive to solidify the modular components into the final assembly and provide weight-bearing rigidity to the crew rest module 100. This space can be filled with an adhesive by injecting the adhesive into the space. The combination of the tab and slot connection, along with the adhesive, significantly reduces the need for and use of bracketry to connect the peripheral walls of the crew rest and significantly reduces the weight of the crew rest module 100 without sacrificing space and/or compromising its structural integrity. The weight of the crew rest module 100 using the modular components and assembly techniques described herein is from about at least 50% to about 70% less than that of a pre-formed, non-modular crew rest employing traditional internal supports and bracketry.

The modular design of the crew rest module 100 allows significant added flexibility in designing and building a commercial aircraft. The modular crew rest module 100 can be purchased in bulk and the option of a one-seat crew rest or a two-seat crew rest can be selected and implemented with only minimal added assembly operations. Also, because the crew rest 100 is secured to the existing frame of the aircraft 102, the crew rest module 100 can be retrofit into an existing aircraft 102.

While the teachings have been described in terms of various specific embodiments, those skilled in the art will recognize that the teachings can be practiced with modification within the spirit and scope of the claims.

What is claimed is:

1. An aircraft comprising:
    an airframe including a fuselage, the fuselage comprising:
        a plurality of frame members;
        a passenger cabin area formed within the fuselage;
        a floor defining a portion of the passenger cabin area;
        a center section of seats disposed on the floor; and
        a crown positioned above a center section of seats; and
    a crew rest module disposed within the fuselage, the crew rest module comprising:
        an entrance module defined by at least two entrance module peripheral walls and having a seating area; and
        a bunk module being separate from the seating area and being defined by at least three bunk module peripheral walls,
        wherein the entrance module peripheral walls and the bunk module peripheral walls are sized to fit through a passenger door leading to the passenger cabin area of the aircraft when the aircraft is substantially assembled.

2. The aircraft of claim 1, wherein the seating area further defines an elevated platform structurally coupled to the seating area peripheral walls.

3. The aircraft of claim 2, wherein the seating area elevated platform defines a space for stowage thereunder.

4. The aircraft of claim 1, wherein the seating area comprises two seats.

5. The aircraft of claim 1, wherein the seating area is supported by at least one of the floor of the fuselage and the frame of the fuselage.

6. The aircraft of claim 1, wherein the bunk portion comprises at least two sleeping berths.

7. The aircraft of claim 6, wherein the sleeping berths are side-by-side each having a length of at least about 78 inches, a width of at least about 30 inches, and a volume of at least about 35 square feet.

8. The aircraft of claim 1, wherein the bunk portion is positioned above the center section of seats.

9. The aircraft of claim 1, wherein the bunk portion is supported by the frame members in the crown of the fuselage.

10. The aircraft of claim 1, wherein the fuselage frame members are positioned at about 24-inch intervals.

11. The aircraft of claim 1, wherein the bunk portion is supported by at least five frame members in the crown of the fuselage.

12. An aircraft comprising:
    an airframe including a fuselage, the fuselage comprising:
        a passenger cabin area formed within the fuselage, the passenger cabin area having a plurality of spaced apart seats;
        a floor defining a portion of the passenger cabin area;
    a crew rest module disposed within the passenger cabin area of the fuselage, the crew rest module comprising:
        an entrance module defined by at least two entrance module peripheral walls and having a seat supported on a floor portion of the entrance module, the floor portion being elevated above the floor of the passenger cabin area by a predetermined height; and
        a bunk module being separate from, but adjacent to, the entrance module, the bunk module defined by at least three bunk module peripheral walls,
        wherein the entrance module peripheral walls and the bunk module peripheral walls are sized to fit through a passenger door of the aircraft leading to the passenger cabin area of the aircraft when the aircraft is substantially assembled.

13. The aircraft of claim 12, wherein the bunk module is disposed at a different elevation within said crew rest module from said entrance module.

14. The aircraft of claim 13, wherein the bunk module is elevationally above the floor of the entrance module.

15. The aircraft of claim 14, further including at least one step disposed adjacent the bunk module for assisting a crew member with ingress and egress between the bunk module and the entrance module.

16. The aircraft of claim 12, wherein the entrance module includes an additional seat positioned adjacent to said seat.

17. The aircraft of claim 16, wherein the seat and the additional seat are mounted to said floor portion of the entrance module so as to be facing in opposite directions.

18. The aircraft of claim 17, further comprising a moveable curtain positioned between the seat and the additional seat.

19. The aircraft of claim 12, wherein the bunk module includes an alternate egress opening to permit egress by a crew member from the bunk module.

20. An aircraft comprising:
    a crew rest module disposed within a passenger cabin area of a fuselage of the aircraft, the crew rest module comprising:
        an entrance module defined by at least two entrance module peripheral walls and having first and second seats supported on a floor portion of the entrance module, the floor portion being elevated above a floor of the passenger cabin area by a predetermined height to enable placement of a galley cart underneath the floor portion of the entrance module;
        a first stairway for assisting with ingress and egress between the floor of the passenger cabin area and the entrance module;
        the first and second seats being secured to the floor portion of the entrance module in opposite facing directions and being laterally offset from one another;
        a moveable privacy curtain positioned between the first and second seats;
        a bunk module being separate from, but adjacent to, the entrance module, the bunk module defined by at least three bunk module peripheral walls;
        the bunk module further having a floor portion that is disposed elevationally above a floor portion of the entrance module, the bunk module having dimensions permitting a crew member to repose therein;
        a second stairway disposed adjacent the bunk module for assisting a crew member with ingress and egress between the entrance module and the bunk module;
        an alternate egress opening forming in the floor portion of the bunk module; and
        the entrance module peripheral walls and the bunk module peripheral walls being sized to fit through a passenger cabin door of the aircraft that leads to the passenger cabin area of the aircraft, when the aircraft is substantially assembled.

* * * * *